Patented July 7, 1925.

1,544,687

UNITED STATES PATENT OFFICE.

LORIN B. SEBRELL AND CLAYTON W. BEDFORD, OF AKRON, OHIO, ASSIGNORS TO THE GOODYEAR TIRE & RUBBER COMPANY, OF AKRON, OHIO, A CORPORATION OF OHIO.

ART OF VULCANIZING OR CURING CAOUTCHOUC SUBSTANCES.

No Drawing. Application filed December 7, 1921, Serial No. 520,689. Renewed April 18, 1925.

*To all whom it may concern:*

Be it known that we, LORIN B. SEBRELL and CLAYTON W. BEDFORD, citizens of the United States, and residents of Akron, Ohio, have invented new and useful Improvements in the Art of Vulcanizing or Curing Caoutchouc Substances, of which the following is a specification.

Our invention relates to accelerators of the vulcanization of rubber and it has, for its primary object, the provision of accelerators of high curing power, which may be prepared in a manner best adapted to facilitate their production.

In Patents Numbers 1,371,662; 1,371,663 and 1,371,664, issued March 15, 1921, a number of accelerating reagents are described as the reaction products of sulfur and nitrogen-containing bodies. In this and in copending applications Serial No. 580,313, filed August 7, 1922; Serial No. 672,825, filed November 5, 1923; and Serial No. 706,079, filed April 12, 1924, and divisions thereof; Serial No. 677,877, filed November 20, 1923, and others, it is our desire to set forth reagents embodying a thiazole ring; such materials possess unusual accelerating properties. The present application deals particularly with that class of compounds which are formed by the reaction of thio-carbanilide and sulfur, as hereinafter shall be disclosed.

As set forth in the above mentioned patents, accelerators of considerable commercial value may be prepared by effecting certain reactions, such as the reaction of sulfur with thiocarbanilid, before the chemicals are incorporated in the rubber mix and subjected to the heat of vulcanization. By establishing proper conditions of temperature and admixture of the reacting materials, a satisfactory accelerator is assured, whereas during vulcanization, such ideal conditions might not obtain.

By our present invention we disclose the specific reaction products which are responsible for the high curing power of the reaction products of sulfur with thiocarbanilid. The desired accelerators may, consequently, be more efficiently produced and utilized to best advantage, by their isolation and use in a pure or semi-pure state.

Jacobson and Frankenbaker, Ber. 24, 1400 (1891), and others, have described mercaptobenzothiazol

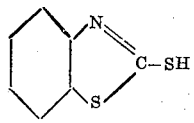

as the sulfur reaction product of phenyl mustard oil

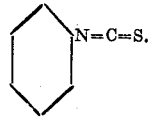

It is also well known that thiocarbanilid decomposes under the influence of heat into phenyl mustard oil and aniline. We have found that both of these reactions occur when thiocarbanilid is heated with sulfur and that the chief reaction products are mercaptobenzothioazol and aniline. Anilidobenzothiazol, thioanilines, hydrogen sulfide, carbon bisulfide and other products are also formed.

We have also discovered that an excess of sulfur oxidizes mercaptobenzothiazol to form benzothiazyl-disulfide,

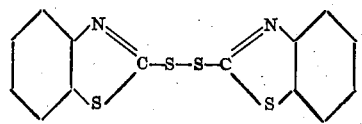

which in turn dissolves sulfur to form polysulfides, the probable formula of which is as follows:

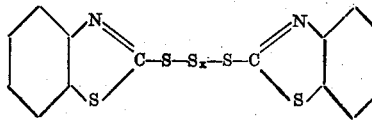

Benzothiazyl disulfide polysulfide.

Extensive experiments have definitely established that the free mercaptan, its normal or basic lead or zinc salts, its disulfide or disulfide polysulfide are all desirable accelerators for the vulcanization of rubber by sulfur. Furthermore, depending upon the rubber compound in which they are to be utilized, they may be isolated and employed in a pure or nearly pure condition. The reaction products of thiocarbanilid and sulfur may be separated from aniline before their use, or they may be utilized without isolating any of the resulting constituents.

It has also been determined that mercaptobenzothiazol will react further with sulfur and that a second substitution of sulfur in the nucleus may occur. If this sulfuration process is not permitted to proceed too far, an accelerator of high power may still be obtained.

In order to illustrate the merits of accelerators prepared in accordance with our invention, we have vulcanized rubber under different degrees of steam pressure and tested the physical properties of the resulting products. In addition to comparing the accelerators with each other, such tests prove the desirability of such accelerators with respect to similar reagents known to those familiar with the art.

In the following chart is shown the time required to cure rubber at 20 pounds and 40 pounds of steam pressure. Although the usual curing temperature adopted is represented by 40 pounds steam pressure, the lower steam pressure was also utilized because the trend of present day practice is to reduce the temperature.

In the following examples, a mixture was utilized which consisted of:

|  | Parts |
|---|---|
| Smoked sheet | 100. |
| Zinc oxide | 5. |
| Sulfur | 3.5 |

One part of mercaptobenzothiazol was used and equivalent proportions of its derivatives to correspond to one molar weight of the original mercaptan.

|  | Optimum cure | | Maximum tensile strength | | Load to give 700% elongation | |
|---|---|---|---|---|---|---|
| Steam pressure | 20 lbs. | 40 lbs. | 20 lbs. | 40 lbs. | 20 lbs. | 40 lbs. |
|  | hrs. min. | hrs. min. | $kg./cm.^2$ | $kg./cm.^2$ | $kg./cm.^2$ | $kg./cm.^2$ |
| Mercaptobenzothiazol | 1  30 | 0  30 | 210 | 200 | 160 | 110 |
| Zinc salt of mercaptobenzothiazol | 1  00 | 0  15 | 240 | 210 | 220 | 210 |
| Lead salt of mercaptobenzothiazol | 1  00 | 0  15 | 210 | 190 | 210 | 190 |
| Benzothiazyl-disulfide | 1  30 | 0  30 | 180 | 170 | 150 | 110 |

The fact that the above accelerators may be isolated from the reaction products of sulphur and nitrogen-containing bodies permits of their purification, which aids in reducing the length of time necessary to effect the best cure, as well as to avoid the softening action of the thioanilines which otherwise are present.

Although we have specifically described accelerators that may be utilized in promoting the vulcanization of rubber and stated our theories with regard thereto, it is obvious that minor changes may be made in the application of the principles of our invention without departing from the spirit and scope thereof and we desire, therefore, that only such limitations shall be imposed as are indicated in the appended claims.

What we claim is:

1. A method of accelerating the vulcanization of caoutchouc that comprises vulcanizing the same in the presence of a material embodying the following organic structure

2. A method of accelerating the vulcanization of caoutchouc that comprises vulcanizing the same in the presence of a mercaptothiazole, or derivative thereof.

3. A method of accelerating the vulcanization of caoutchouc that comprises vulcanizing the same in the presence of a metallic salt of a mercaptothiazole.

4. A method of accelerating the vulcanization of caoutchouc that comprises vulcanizing the same in the presence of a bivalent metallic salt of mercaptothiazole.

5. A method of accelerating the vulcanization of caoutchouc that comprises vulcanizing the same in the presence of a zinc salt of a mercaptothiazole.

6. A method of accelerating the vulcanization of caoutchouc that comprises vulcanizing the same in the presence of a thiazyl-disulfide.

7. A method of accelerating the vulcanization of caoutchouc that comprises vulcanizing the same in the presence of a thiazyl-disulfide-polysulfide.

8. A method of accelerating the vulcanization of caoutchouc that comprises vulcanizing the same in the presence of a mercaptoarylthiazole, or a derivative thereof.

9. A method of accelerating the vulcanization of caoutchouc that comprises vulcanizing the same in the presence of a metallic salt of a mercaptoarylthiazole.

10. A method of accelerating the vulcanization of caoutchouc that comprises vulcanizing the same in the presence of a zinc salt of a mercaptoarylthiazole.

11. A method of accelerating the vulcanization of caoutchouc that comprises vulcanizing the same in the presence of an aryl-thiazyl-disulfide.

12. A method of accelerating the vulcanization of caoutchouc that comprises vulcanizing the same in the presence of an arylthiazyl-disulfide-polysulfide.

13. A method of accelerating the vulcanization of caoutchouc which comprises vulcanizing the same in the presence of a sulfur reaction product of phenyl mustard oil.

14. A method of accelerating the vulcanization of caoutchouc which comprises vulcanizing the same in the presence of mercaptobenzothiazole.

15. A method of accelerating the vulcanization of caoutchouc which comprises vulcanizing the same in the presence of benzothiazyl-disulfide.

16. A method of accelerating the vulcanization of caoutchouc which comprises vulcanizing the same in the presence of benzothiazyl-disulfide-polysulfide.

17. A method of accelerating the vulcanization of caoutchouc which comprises vulcanizing the same in the presence of a metallic salt of mercaptobenzothiazole.

18. A method of accelerating the vulcanization of caoutchouc which comprises vulcanizing the same in the presence of a bivalent metallic salt of mercaptobenzothiazole.

19. A method of accelerating the vulcanization of caoutchouc which comprises vulcanizing the same in the presence of a zinc salt of mercaptobenzothiazole.

20. A caoutchouc product which has been vulcanized in the presence of a material employing a thiazole ring having a mercapto group joined to the saturated carbon atom or a derivative of this material.

21. A caoutchouc product which has been vulcanized in the presence of a mercaptothiazole or a derivative thereof.

22. A caoutchouc product which has been vulcanized in the presence of a mercaptoarylthiazole or a derivative thereof.

23. A caoutchouc product which has been vulcanized in the presence of a sulfur reaction product of phenyl mustard oil.

24. A caoutchouc product which has been vulcanized in the presence of mercaptobenzothiazole.

25. A caoutchouc product which has been vulcanized in the presence of benzothiazyl-disulfide.

26. A caoutchouc product which has been vulcanized in the presence of benzothiazyl-disulfide-polysulfide.

27. A caoutchouc product which has been vulcanized in the presence of a metallic salt of mercaptobenzothiazole.

28. A caoutchouc product which has been vulcanized in the presence of a bivalent metallic salt of mercaptobenzothiazole.

29. A caoutchouc product which has been vulcanized in the presence of a zinc salt of mercaptobenzothiazole.

30. A caoutchouc product which has been vulcanized in the presence of a basic salt of mercaptobenzothiazole.

31. A caoutchouc product which has been vulcanized in the presence of a basic metallic salt of mercaptobenzothiazole.

In witness whereof we have hereunto signed our names in the presence of two subscribing witnesses.

LORIN B. SEBRELL.
CLAYTON W. BEDFORD.

Witnesses:
O. E. BEE,
C. M. CARSON.